(12) United States Patent
Paksoy et al.

(10) Patent No.: US 8,762,340 B2
(45) Date of Patent: Jun. 24, 2014

(54) METHODS AND SYSTEMS FOR BACKING UP A SEARCH INDEX IN A MULTI-TENANT DATABASE ENVIRONMENT

(75) Inventors: Mustafa Paksoy, Toronto (CA); Jeffrey Bergan, San Francisco, CA (US); Kanishka Maheshwari, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 620 days.

(21) Appl. No.: 12/973,634

(22) Filed: Dec. 20, 2010

(65) Prior Publication Data

US 2011/0282839 A1 Nov. 17, 2011

Related U.S. Application Data

(60) Provisional application No. 61/334,686, filed on May 14, 2010.

(51) Int. Cl.
*G06F 7/00* (2006.01)
*G06F 17/00* (2006.01)
*G06F 11/14* (2006.01)

(52) U.S. Cl.
CPC ........ *G06F 11/1451* (2013.01); *G06F 11/1458* (2013.01); *G06F 11/1464* (2013.01)
USPC ........................................................ 707/640

(58) Field of Classification Search
CPC ............ G06F 11/1451; G06F 11/1458; G06F 11/1464; G06F 11/1469; G06F 11/1456
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

*Primary Examiner* — Ajay Bhatia
*Assistant Examiner* — Jessica N Le
(74) *Attorney, Agent, or Firm* — Blakely, Sokoloff, Taylor & Zafman

(57) ABSTRACT

An index to be backed up in a multitenant environment is identified. The multitenant environment includes data for multiple client entities, each identified by a tenant identifier (ID) having one or more users associated with the tenant ID. Users of each of multiple client identities can only access data identified by a tenant ID associated with the respective client entity. The multitenant environment is a hosted database provided by an entity separate from the client entities, and provides on-demand database service to the client entities. A staged copy of the index to be backed up is created. The staged copy of the index is segmented. The segments are uploaded to a pre-selected location.

26 Claims, 6 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,675,205 B2 * | 1/2004 | Meadway et al. ............ 709/219 |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0035673 A1 * | 3/2002 | Roseborough et al. ....... 711/129 |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0184220 A1 * | 12/2002 | Teraguchi et al. ............... 707/10 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0068479 A1 * | 4/2004 | Wolfson et al. .................... 707/1 |
| 2004/0103342 A1 * | 5/2004 | Moser et al. ...................... 714/6 |
| 2004/0128001 A1 | 7/2004 | Levin et al. |
| 2004/0133591 A1 * | 7/2004 | Holenstein et al. ........... 707/102 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0044151 A1 * | 2/2005 | Jiang et al. .................... 709/206 |
| 2005/0050555 A1 | 3/2005 | Exley et al. |
| 2005/0091098 A1 | 4/2005 | Brodersen et al. |
| 2005/0223022 A1 * | 10/2005 | Weissman et al. ............ 707/102 |
| 2006/0101083 A1 * | 5/2006 | Cherkauer et al. ............ 707/200 |
| 2007/0185912 A1 * | 8/2007 | Gupta et al. .................... 707/200 |
| 2009/0006535 A1 * | 1/2009 | Tsaur et al. .................... 709/203 |
| 2009/0094236 A1 * | 4/2009 | Renkes et al. ...................... 707/6 |
| 2009/0228528 A1 * | 9/2009 | Ercegovac et al. ............ 707/203 |
| 2010/0127900 A1 * | 5/2010 | Schneider ........................ 341/51 |
| 2010/0179959 A1 * | 7/2010 | Shoens ............................ 707/758 |
| 2011/0231362 A1 * | 9/2011 | Attarde et al. ................. 707/609 |
| 2012/0233125 A1 * | 9/2012 | Sen et al. ....................... 707/645 |
| 2012/0233396 A1 * | 9/2012 | Flynn et al. .................... 711/108 |

* cited by examiner

US 8,762,340 B2

METHODS AND SYSTEMS FOR BACKING UP A SEARCH INDEX IN A MULTI-TENANT DATABASE ENVIRONMENT

CLAIM OF PRIORITY

This application claims the benefit of U.S. Provisional Patent Application 61/334,686, entitled Methods and Systems for Backing Up a Search Index In a Multi-Tenant Database Environment, by Mustafa Paksoy, et al., filed May 14, 2010, the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to database indexing. More particularly embodiments relate to techniques and mechanisms for generating backups for search indexes in multi-tenant database environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

In order to be useful, large collections of data must be searchable and/or effectively organized. One technique to improve data search and/or retrieval is indexing, which provides structure within which data may be organized or viewed to provide more efficient access to the data. Many indexing techniques exist each having associated advantages and disadvantages.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
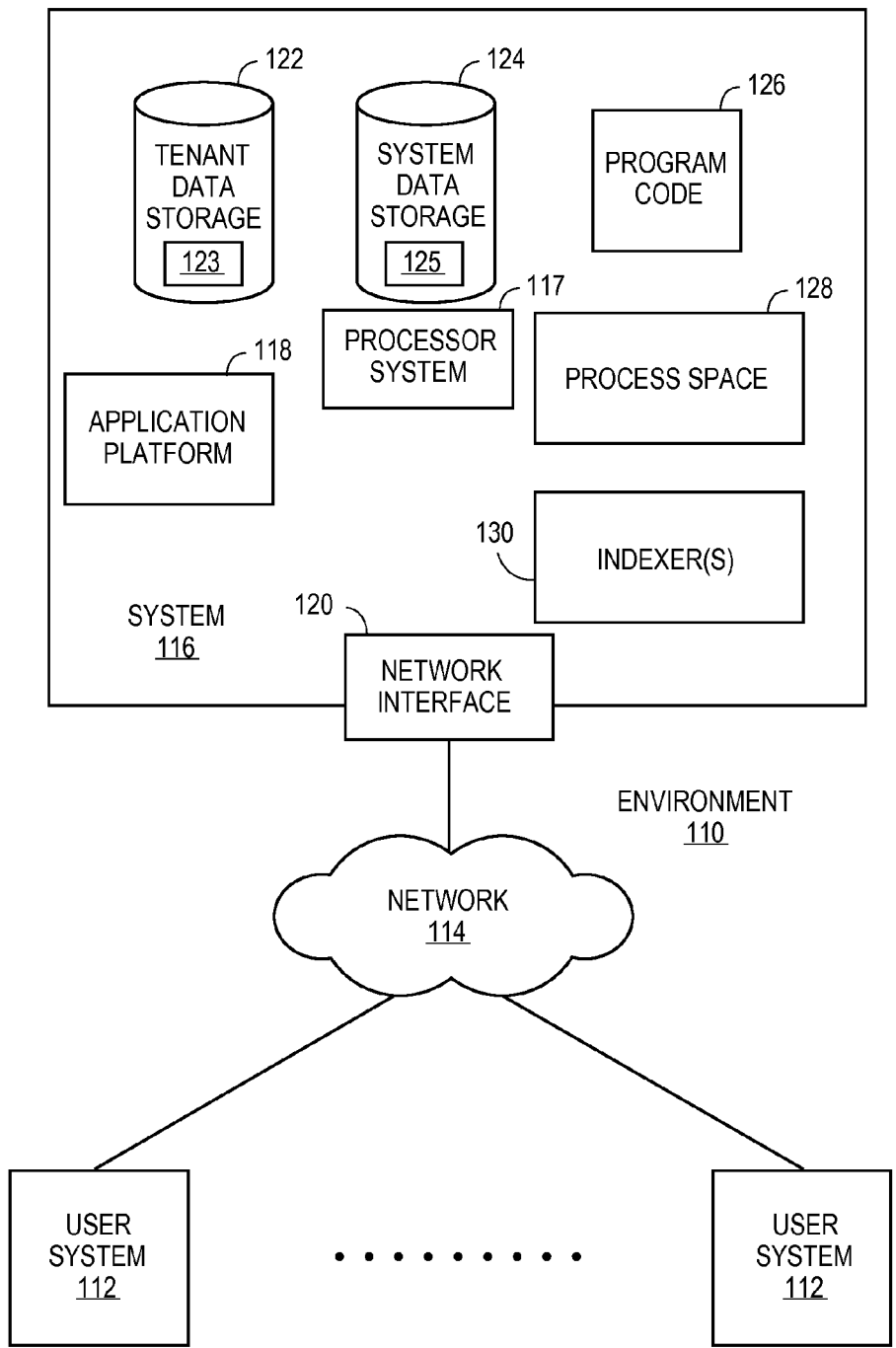
FIG. 1 is a block diagram of an environment in which an on-demand database service might be used.

In the following description, numerous specific details are set forth. However, embodiments may be practiced without these specific details. In other instances, well-known circuits, structures and techniques have not been shown in detail in order not to obscure the understanding of this description.

General Overview

Throughout the description, various examples of indexes are provided. The following general descriptions of may be helpful in better understanding the more detailed embodiments set forth below. For example, multiple customers, organizations, subscribers, or users, each may have their own distinct collections of data, may make use of the multi-tenant database implementation for storing their data. In order to optimize searching and other functions, an "index" is provided for certain collections of data. For example, an index may be provided for all data associated with one particular customer, thus improving search capabilities for information within that customer's collection of data.

Systems and methods are provided herein for indexing of data in a multi-tenant database system. As used herein, a multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

In the description that follows, various techniques will be provided that support secondary indexing for one or more tenants of a multi-tenant database. It is useful to provide infrastructure and tools for a secondary indexing system that allow for full re-indexing of organizations and/or multi-tenant database instances in the background while production indexing and querying proceeds. The new indexes may then be swapped in for the old indexes using, for example, an atomic swap operation.

In one embodiment, one or more multi-tenant database instances have at least two indexing hosts, however, only one is used in a Single-Writer, Multi-Reader system. Because of this, each organization only has one index. Re-indexing an organization is done in place, record by record, and in order to re-index a single record, a new document is recreated, indexed, and finally the current indexed document corresponding to the record is removed. Deletion of a record in the application, forces deletion of the document in the organization's index. Deletion of a document may take a relatively long time as the document must first be found in the index and then removed.

Search functionality in a multi-tenant database environment may be powered by full-text indexes. These indexes are typically built and maintained separately from data stored in the database. In a disaster recovery scenario, rebuilding these indexes may take a long time. As such, it is desirable to have a way of backing up and restoring these indexes in case the active index becomes corrupted or is lost.

These indexes may be under constant churn making it challenging to provide consistent copies of data that is actively being changed. On the other hand, indexing cannot simply stop during the backup process because this may undermine high-availability commitments and goals.

In one embodiment, indexing may be suspended for a relatively short duration to make a temporary copy of the search index to a staging location. From there, the index may be split into chunks called "partitions." In one embodiment, each partition is a readable small index that contains only a subset of data that is stored. In one embodiment, these partitions may be compressed and written to storage service one at a time. In one embodiment, this may be provided using an asynchronous message queue to ensure error resilience.

In one embodiment, if an index is corrupted or lost, an administrator may manually initiate a restore process. In one embodiment, the administrative interface shows multiple or all backups for a given index. The administrator can see the status of previous backups and which partitions they contain.

In one embodiment, once the restore process is initiated, each partition is downloaded from the storage service and a copy of the whole index is rebuilt in a temporary staging location. In one embodiment, the same asynchronous message queue approach is utilized to ensure resilience during this process. When the index is rebuilt, indexing may be suspended for a relatively short duration while the active index is swapped with the backup.

At this stage, the backup index may be used as the active index. Even though this backup copy will be readable, it will be missing the most recent changes made to the index. In one embodiment, this index is brought up-to-date by repeating all indexing work that has been done since the time of the backup. In one embodiment, a replay log of indexing work is maintained to allow this.

In one embodiment, search indexes are maintained for efficiently searching through data stored in normalized database tables. This functionality may provide the backbone of search-based navigation in a multi-tenant database environment. In one embodiment, as records are created, updated and deleted, indexes are incrementally updated to keep up to date. Other larger workloads, such as re-indexing whole organizations, result in extensive delays before search functionality is fully usable again.

In a disaster recovery scenario, re-indexing a whole instance of a multi-tenant database could take a relatively long time to complete. During this time, database search functionality may be unreliable and unusable for all users. Given the central role search plays, this is a critical problem.

In one embodiment, trustworthy backups may provide the following features. Each search backup is a usable copy of the search index at the time it is made (Known Good State). Retention of backup copies to allow non-corrupted index backups to be restored (Backup Retention). One or more backup index is maintained in a different physical location than the current index (Off-Site Backup).

In one embodiment, the functionality described herein may be provided as part of a two-stage process. The first stage involves automating the process of backing up and restoring a single index on demand. The second stage requires scheduling these backups so that indexes are backed up periodically on a predictable timetable.

FIG. 1 is a block diagram of an environment in which an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 3) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein.

A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. Indexer(s) 130 may include one or more indexers that operate as described herein with the indexes created by indexer(s) 130 being backed up as described herein.

One arrangement for elements of system 116 is shown in FIG. 1, including network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers.

The user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application (s) including computer code to run using a processing unit such as processor system 117, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Example Index Backup and Recovery Techniques

Figure 2:
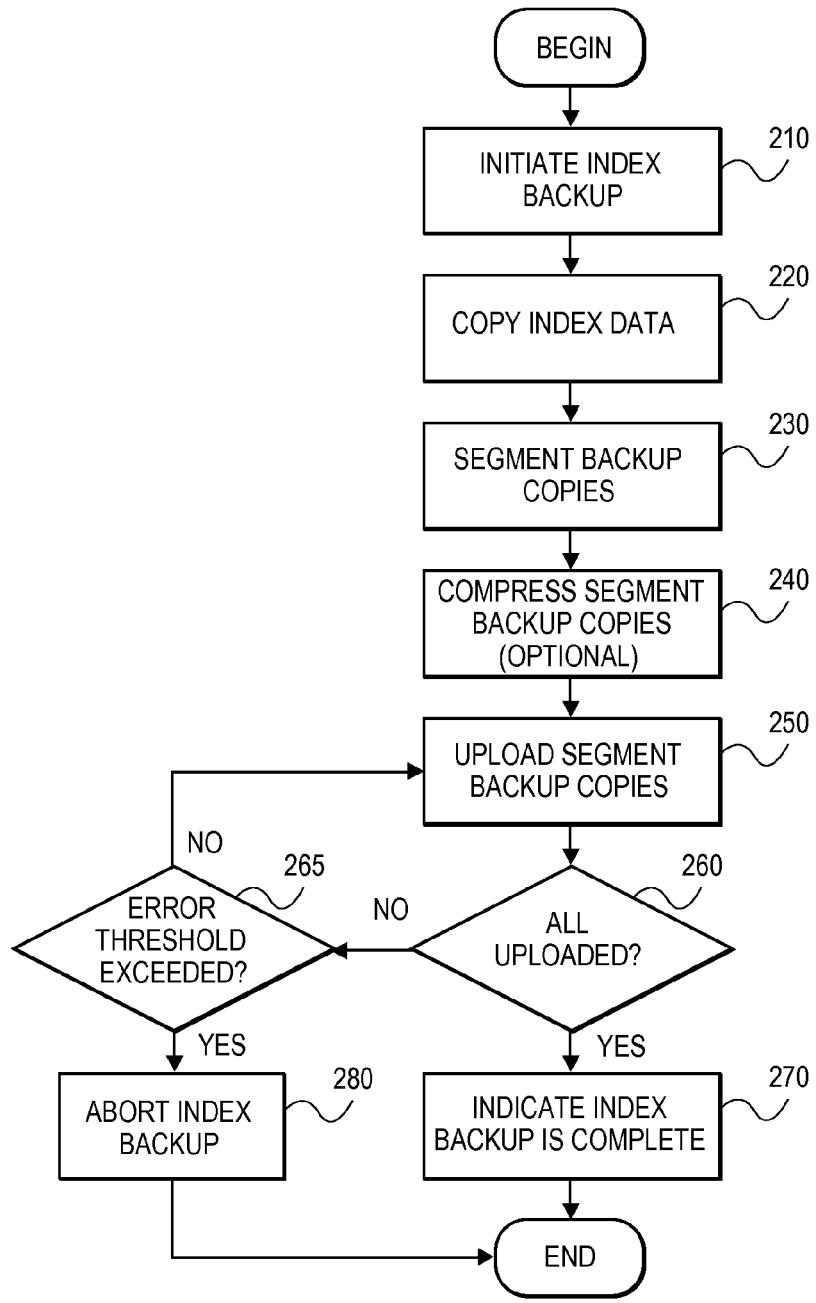
FIG. 2 is a flow diagram of one embodiment of a technique for providing an index backup.

FIG. 2 is a flow diagram of one embodiment of a technique for providing an index backup. In one embodiment, because a single backup operation can take an extended period of time, to ensure robustness this process may be split into multiple stages handled asynchronously through a message queue. In one embodiment, a new backup request may be enqueued only if there are no outstanding backup requests for the given index identifier.

An index backup is initiated, 210. The index backup may be initiated in any manner known in the art. In one embodiment, backups may be manually initiated, for example, by selecting a command from a menu or by selecting a button on a graphical user interface (GUI). In an alternate embodiment, an automated process may initiate backups, for example, after a pre-selected period of time, after creation and/or modification of a pre-selected number of files. Other techniques may also be utilized to initiate backups of index data.

Index files to be backed up may correspond to a single tenant in a multitenant database, multiple tenants in a multitenant database, or to a subset of data for a tenant in a multitenant database (subtenant index). As described above, tenants of a multitenant database may utilize a tenant ID, which may be used in the process of authenticating, initiating, authorizing, storing, transmitting and/or restoring index data.

In one embodiment, index files are maintained utilizing a replay log to keep the indexes up to date within a pre-selected amount of time. For example, an index may be maintained within 3 hours of current. Any threshold value may be utilized to provide the desired performance-overhead balance. By utilizing the replay logs, index backups may be maintained within the pre-selected amount of time of being current. Further, because the replay logs are maintained, a restored index may be caught up to provide a current index without excessive indexing resource consumption.

In one embodiment, index files to be backed up are copied, 220. The index file may be copied to a temporary location for further processing. In one embodiment, the index file to be copied is locked during copying so that the index backup file(s) result in an accurate snapshot of the index file.

In one embodiment, index backup file is segmented if it exceeds a pre-selected size, 230. In one embodiment, the segments are limited to the pre-selected size. In an alternate embodiment, the segments may be approximately equal in size. Other segmenting schemes may also be used. The segments are further linked or otherwise tracked so that ordering may be preserved as necessary.

In one embodiment, the index segments may be compressed, 240. Segment compression is an optional feature and may be selectively utilized based on, for example, segment size, available storage space, number of segments to be stored, etc. Any compression technique known in the art may be utilized.

The index segments are uploaded to a known storage location, 250. In one embodiment, the compressed index segments are sequentially uploaded to a remote storage device. Uploading segments in a sequential manner allows the backup to be stored remotely without consuming large amounts of bandwidth and allows for retries of failed attempts to be more efficient than retrying a much larger file. In alternative embodiments, the index segments may be uploaded in a different order, although, preferably the sequence of the segments is maintained (e.g. associating a sequence number with each segment).

After a segment is uploaded, 250, the backup mechanism determines whether, in one embodiment, all segments have been uploaded, 260. If all segments have not been uploaded, 260, the current segment may be retried if necessary. If the number of retries for a segment exceeds a retry threshold, 265, the backup process may be aborted 280. If all segments have not been uploaded, 260, and the current segment has been successfully uploaded, 265, the backup mechanism may upload the subsequent segment 250. This process continues until all segments have been uploaded, 260. In one embodiment, the backup mechanism may only determine if the current segment uploaded properly and retry that segment as necessary. In this or other embodiments, an error during the upload process may cause a notification to be sent or displayed to an administrator of the system.

When all segments have been uploaded, the backup mechanism indicates that the backup is complete, 270. In one embodiment, the backup index segments are stored on a different device and/or remotely from the active files in order to provide more secure backups. The backup index segments may also be encrypted and/or otherwise secured, for example, through use of a digital signature or other encryption techniques' when the segments are uploaded.

Figure 3:
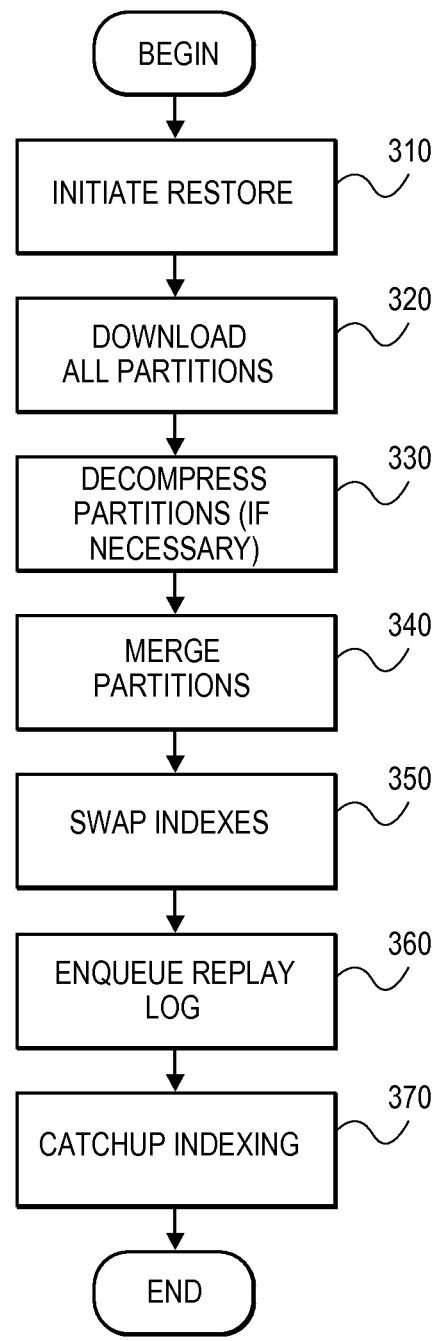
FIG. 3 is a flow diagram of one embodiment of a technique for restoring an index backup.

FIG. 3 is a flow diagram of one embodiment of a technique for restoring an index backup. The process of FIG. 3 may provide the functionality of restoring an index by utilizing a backup index file created as described with respect to FIGS. 2 and 4.

An index restore operation is initiated, 310. The index restore operation may be initiated in any manner known in the art. In one embodiment, index restoration may be manually initiated, for example, by selecting a command from a menu or by selecting a button on a graphical user interface. In an alternate embodiment, an automated process may initiate backups, for example, in response to detecting a catastrophic event, or in response to detecting deletion of data over a pre-selected threshold. Other techniques may also be utilized to initiate restoration of index data.

As discussed above, index files to be backed up may correspond to a single tenant in a multitenant database, multiple tenants in a multitenant database, or to a subset of data for a tenant in a multitenant database (subtenant index). Accordingly, restoration of index data by tenants of a multitenant database may utilize a tenant ID, which may be used in the process of authenticating, initiating, authorizing, storing, transmitting and/or restoring index data.

The partitions corresponding to the index data to be restored are downloaded, 320. In one embodiment, each of the one or more partitions that correspond to the index to be restored is sequentially downloaded. This may result in a more efficient use of available bandwidth because retries are required for only the segment for which a download has failed and not for the complete index file, which can be relatively large. In an alternative embodiment, the partitions may be downloaded in a non-sequential way.

The partitions are decompressed, if necessary, 330. Decompression can be accomplished by using a pre-selected decompression technique, or the index restoration mechanism may analyze the segments to determine what, if any, compression technique was utilized.

The partitions are merged, 340. In one embodiment, the individual partitions include information regarding ordering and/or index size to facilitate merger of the segments. In another embodiment, a table or other structure may be maintained to coordinate orderings of the partitions. Merger of the various partitions results in an index file that is current as of the time the time the index backup was initiated.

Once the partitions are merged to create the backup index file, the backup index can be swapped with the current index file, 350. In one embodiment, the swap of index files is performed as an atomic operation. At this point, the index is current as of the time the backup was initiated. That is, activity that occurred after the index backup was initiated is not reflected in the restored index. To get the restored index up to date, a replay log may be utilized.

A replay log that tracks operations since initiation of the backup that results in the restored index file is enqueued, or otherwise provided to one or more indexing mechanisms, 360. The one or more indexing mechanisms operate on the contents of the replay log to result in an index that is up to date. In one embodiment, indexing is accomplished by appending the index file rather than overwriting. Thus, an index file may be caught up to date by appending transactions after the index file has been restored.

In the example of FIG. 3, for example, index file swapping and replay log utilization are described in a particular order. This is but one example of the ordering that may be utilized. In alternate embodiments, for example, the catch-up indexing utilizing the replay log may be performed before the index swap operation.

Example Index Backup and Recovery Mechanisms

Figure 4:
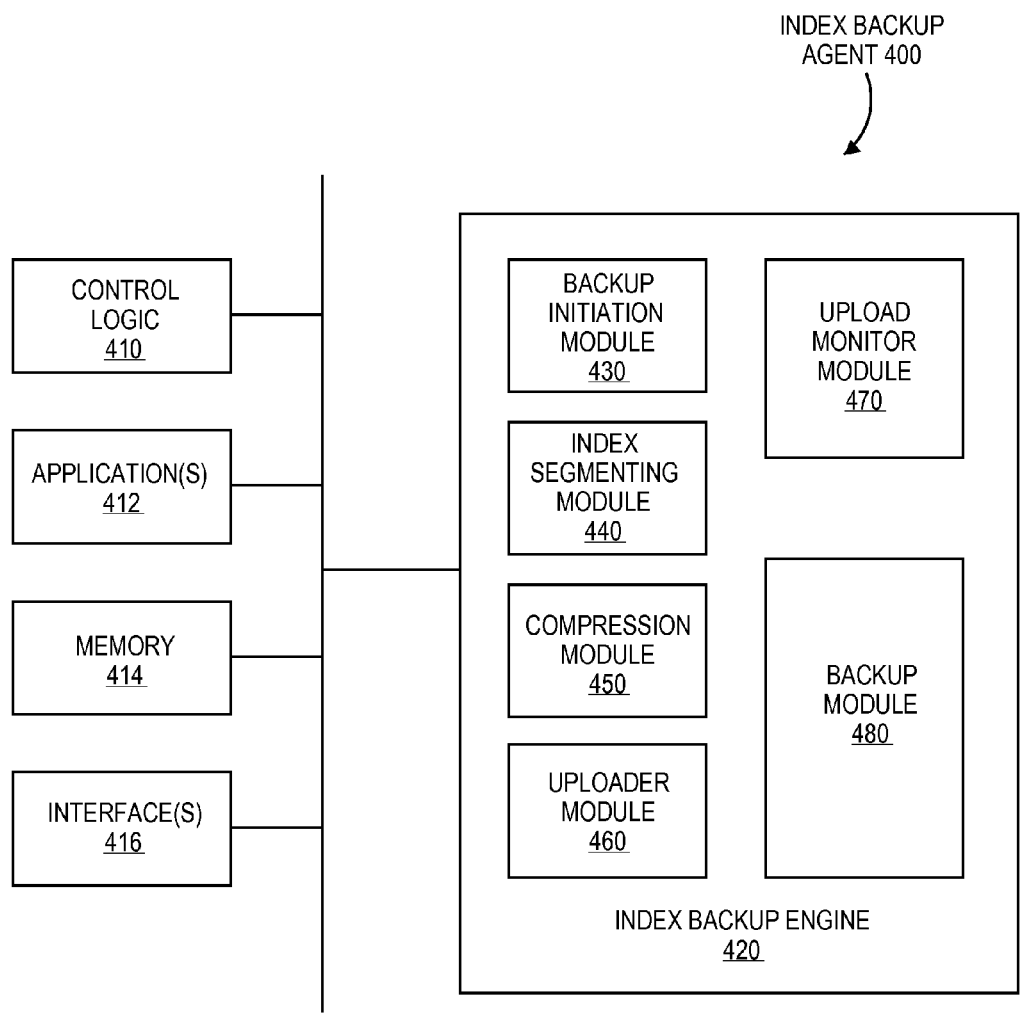
FIG. 4 is a block diagram of one embodiment of an agent to provide index backups.

FIG. 4 is a block diagram of one embodiment of an agent to provide index backups. In one embodiment, one or more index backup agents may exist and/or operate within the multitenant environment. The agent of FIG. 4 may provide index backup functionality as described, for example, with respect to FIG. 2. The agent of FIG. 4 may also provide additional functionality.

In one embodiment, index backup agent 400 includes control logic 410, which implements logical functional control to direct operation of index backup agent 400, and/or hardware associated with directing operation of index backup agent 400. Logic may be hardware logic circuits and/or software routines. In one embodiment, index backup agent 400 includes one or more applications 412, which represent a code sequence and/or programs that provide instructions to control logic 410.

Index backup agent 400 includes memory 414, which represents a memory device and/or access to a memory resource for storing data and/or instructions. Memory 414 may include memory local to index backup agent 400, as well as, or alternatively, including memory of the host system on which index backup agent 400 resides. Index backup agent 400 also includes one or more interfaces 416, which represent access interfaces to/from (an input/output interface) index backup agent 400 with regard to entities (electronic or human) external to index backup agent 400.

Index backup agent 400 also includes index backup engine 420, which represents one or more functions or module that enable index backup agent 400 to provide the index backups as described above. The example of FIG. 4 provides several modules that may be included in index backup engine 420; however, different and/or additional modules may also be included. Example modules that may be involved in providing the index backup functionality include backup initiation module 430, index segmenting module 440, compression module 450, uploader module 460 and/or upload monitor module 470. Each of these modules may further include other sub-modules to provide other functions. As used herein, a module refers to routine, a subsystem, logic circuit, microcode, etc., whether implemented in hardware, software, firmware or some combination thereof.

Backup initiation module 430 operates to initiate index backups in response to pre-selected conditions. The conditions that cause backup initiation module 430 to initiate an index backup may be pre-selected conditions and/or explicit user input. In one embodiment, the multitenant environment provides a graphical user interface that allows one or more users to specify the conditions that result in an index backup. The user interface may also include a mechanism to explicitly trigger a backup. In response to these conditions, backup initiation module 430 may cause one or more other modules to generate and/or store backup index files.

Index segmentation module 440 operates to segment the index file backup copies. In one embodiment, index segmentation module segments the backup index file if the backup index file is larger than a predetermined segment size. In one embodiment, segmentation module 440 may include a mechanism to allow user configuration of the segment size. Index segmenting module may store the segments in memory 414 for further processing.

Compression module 450 may provide data compression for one or more of the backup index segments. Any compression technique known in the art may be utilized to provide a compressed segment. In one embodiment, the compression technique to be utilized may be selected based on the level of compression to be provided by the technique.

Uploader module 460 causes the backup index segments to be copied to one or more pre-selected locations where the segments may be stored until needed. In one embodiment, uploader module 460 causes the one or more backup index segments to be transmitted over a network to a storage location. Upload monitor module 470 may manage the transmission of backup index segments by uploader module 460. Upload monitor module may provide a graphical user interface to allow a user to provide one or more parameters (e.g., location, transmission protocol, number of copies, notifications to be provided) to be utilized for uploading the backup index segments.

Backup module 480 provides the functionality to copy the index file to be backed up. In one embodiment, backup module 480 locks access to the index file to be backed up and creates a copy of the index file. Backup module 480 creates a copy of the index file in memory 414 or some other storage location. In one embodiment, the copy of the index file created by backup module 480 is segmented by index segmenting agent 440 as described above.

Figure 5:
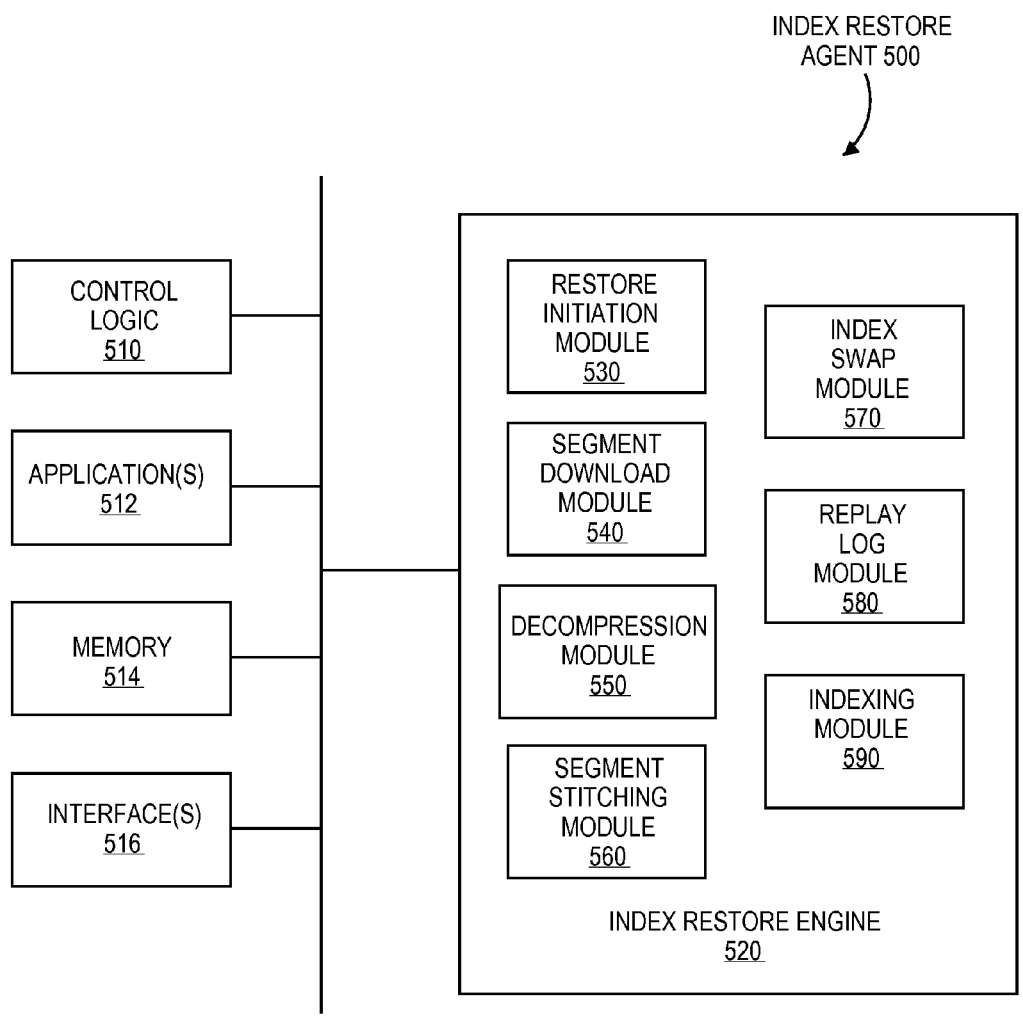
FIG. 5 is a block diagram of one embodiment of an agent to restore index backups.

FIG. 5 is a block diagram of one embodiment of an agent to restore index backups. In one embodiment, one or more index restore agents may exist and/or operate within the multitenant environment. The agent of FIG. 5 may provide index restore functionality as described, for example, with respect to FIG. 3. The agent of FIG. 5 may also provide additional functionality.

In one embodiment, index restore agent 500 includes control logic 510, which implements logical functional control to direct operation of index restore agent 500, and/or hardware associated with directing operation of index restore agent 500. Logic may be hardware logic circuits and/or software routines. In one embodiment, index restore agent 500 includes one or more applications 512, which represent code sequence and/or programs that provide instructions to control logic 510.

Index restore agent 500 includes memory 514, which represents a memory device and/or access to a memory resource for storing data and/or instructions. Memory 514 may include memory local to index restore agent 500, as well as, or alternatively, including memory of the host system on which index restore agent 500 resides. Index restore agent 500 also includes one or more interfaces 516, which represent access interfaces to/from (an input/output interface) index restore agent 500 with regard to entities (electronic or human) external to index restore agent 500.

Index restore agent 500 also includes index restore engine 520, which represents one or more functions or module that enable index restore agent 500 to provide the index backups as described above. The example of FIG. 5 provides several modules that may be included in index restore engine 520; however, different and/or additional modules may also be included. Example modules that may be involved in providing the index backup functionality include restore initiation module 530, segment download module 540, decompression module 550, segment stitching module 560, index swap module 570, replay log module 580 and/or indexing module 590. Each of these modules may further include other sub-modules to provide other functions. As used herein, a module refers to routine, a subsystem, logic circuit, microcode, etc., whether implemented in hardware, software, firmware or some combination thereof.

Restore initiation module 530 operates to initiate backup restoration in response to pre-selected conditions. The conditions that cause restore initiation module 530 to initiate an index restoration may be pre-selected conditions and/or explicit user input. In one embodiment, the multitenant environment provides a graphical user interface that allows one or more users to specify the conditions that result in an index restoration. The user interface may also include a mechanism to explicitly trigger a backup. In response to these conditions, restore initiation module 530 may cause one or more other modules to restore previously copied index files.

Segment download module 540 operates to download index backup segments from a storage location. In one embodiment, segment download module 540 downloads each of one or more segments corresponding to an index to be restored, and stores the segments in memory 514.

Decompression module 550 may provide data decompression for one or more of the backup index segments. Any decompression technique known in the art may be utilized to provide a decompressed segment. In one embodiment, the decompressed segments are stored in memory 514.

Segment stitching module 560 operates to combine multiple index segments into a single index file. In one embodiment, the individual partitions include information regarding ordering and/or index size to facilitate merger of the segments. In another embodiment, a table or other structure may be maintained to coordinate orderings of the partitions. Merger of the various partitions results in an index file that is current as of the time the time the index backup was initiated.

Index swap module 570 operates to swap a restored index file with a current index file that has been corrupted or is otherwise unusable. In one embodiment, index swap module 570 utilizes software locks or other semaphores to provide a reliable swap operation that restores the backup index file so that the backup file may be used as a search index.

Replay log module 580 operates to maintain one or more replay logs corresponding to transactions that occur within the multitenant environment. In one embodiment, replay log module 580 maintains multiple replay logs. In one embodiment, replay log module 580 maintains one replay log for create and update operations and another replay log for delete operations. Other configurations of replay logs may also be maintained. Indexing module 590 provides indexing functionality to generate an index file. Various techniques for generating an index may be utilized.

Example Systems

Figure 6:
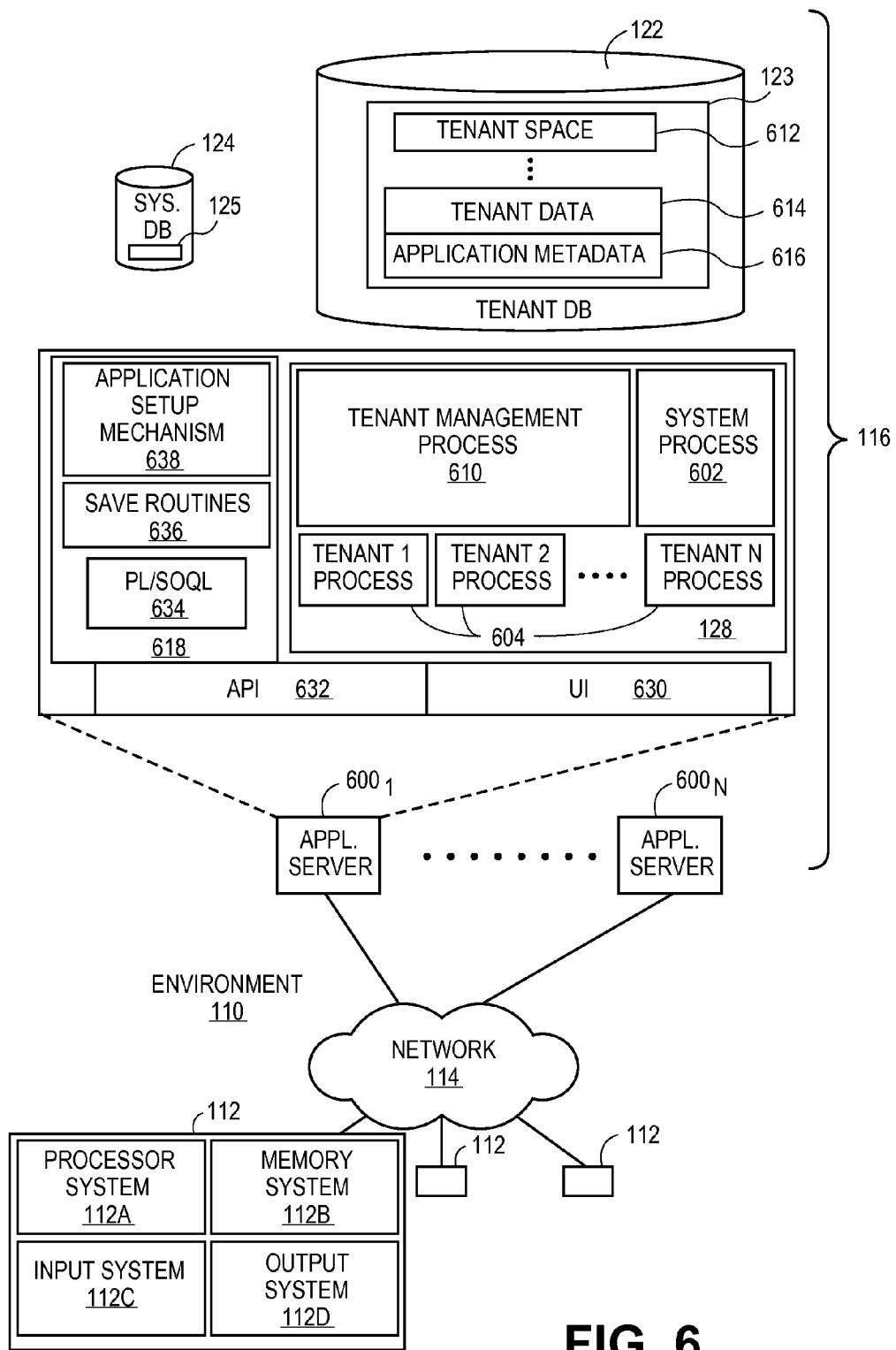
FIG. 6 is a block diagram of one embodiment of a multi-tenant environment.

In FIG. 6 elements of system 116 and various interconnections in an embodiment are further illustrated. FIG. 6 shows that user system 112 may include processor system 112A, memory system 112B, input system 112C, and output system 112D. FIG. 6 shows network 114 and system 116. FIG. 6 also shows that system 116 may include tenant data storage 122, tenant data 123, system data storage 124, system data 125, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 6, system 116 may include a network interface 120 implemented as a set of HTTP application servers 600, an application platform 118, tenant data storage 122, and system data storage 124. Also shown is system process space 602, including individual tenant process spaces 604 and a tenant management process space 610. Each application server 600 may be configured to tenant data storage 122 and the tenant data 123 therein, and system data storage 124 and the system data 125 therein to serve requests of user systems 112. The tenant data 123 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 116 resident processes to users and/or developers at user systems 112. The tenant data and the system data may be stored in various databases, such as one or more Oracle™ databases.

Application platform 118 includes an application setup mechanism 638 that supports application developers' creation and management of applications, which may be saved as metadata into tenant data storage 122 by save routines 636 for execution by subscribers as one or more tenant process spaces 604 managed by tenant management process 610, for example. Invocations to such applications may be coded using PL/SOQL 134 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 125 and tenant data 123, via a different network connection. For example, one application server $600_1$ might be coupled via the network 114 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there may no server affinity for a user and/or organization to a specific application server 600. In one embodiment, therefore, an interface system implementing a load balancing function (e.g., an F5 Big-IP load balancer) is communicably coupled between the application servers 600 and the user systems 112 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 116 is multi-tenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 600 to request and update system-level and tenant-level data from system 116 that may require sending one or more queries to tenant data storage 122 and/or system data storage 124. System 116 (e.g., an application server 600 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema.

Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Conclusion

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for backing up an index, the method comprising:
   identifying an index to be backed up in a multitenant environment, wherein
      the multitenant environment includes data for multiple client entities, each identified by a tenant identifier (ID) having one of one or more users associated with the tenant ID,
      users of each of multiple client identities are only allowed access data identified by a tenant ID associated with the respective client entity, and
      the multitenant environment is at least a hosted database provided by an entity separate from the client entities, and provides on-demand database service to the client entities;
   creating a staged copy of the index to be backed up having multiple stages, wherein the stages are handled asynchronously through a message queue;
   segmenting the staged copy of the index; and
   storing the segments in a pre-selected location.

2. The method of claim 1 further comprising compressing the segments of the staged copy.

3. The method of claim 1 further comprising performing additional indexing to the staged copy of the index based on information from one or more replay logs.

4. The method of claim 1 wherein the index to be backed up is an index corresponding to a single tenant ID within the multitenant environment.

5. The method of claim 1 wherein the index to be backed up is an index corresponding to a multiple tenant IDs within the multitenant environment.

6. A method comprising:
   receiving an indication to restore an index file to replace a faulty index file;
   downloading one or more segments of a backup index file in response to the indication;
   assembling the segments to create the backup index file;
   replacing the faulty index file with the backup index file with an atomic swap operation; and
   updating the backup index file with indexing operations performed based on a replay log having entries corresponding to a time period between creation of the backup index file and restoration of the backup index file, wherein the backup index file is created in a multi-tenant database environment, wherein the multitenant database environment stores data for multiple client entities each identified by a tenant identifier (ID) having one of one or more users associated with the tenant ID, wherein users of each of multiple client entities are only allowed access data identified by a tenant ID associated with the respective client entity, and wherein the multitenant database is a hosted database provided by an entity separate from the client entities, and provides on-demand database service to the client entities.

7. The method of claim 6 wherein the index to be backed up is an index corresponding to a single tenant ID within the multitenant environment.

8. The method of claim 6 wherein the index to be backed up is an index corresponding to a multiple tenant IDs within the multitenant environment.

9. An article of manufacture comprising a non-transitory computer-readable medium having stored thereon instructions that, when executed by one or more processors, cause the one or more processors to:
identify an index to be backed up in a multitenant environment, wherein
the multitenant environment includes data for multiple client entities, each identified by a tenant identifier (ID) having one of one or more users associated with the tenant ID,
users of each of multiple client identities are only allowed access data identified by a tenant ID associated with the respective client entity, and
the multitenant environment is at least a hosted database provided by an entity separate from the client entities, and provides on-demand database service to the client entities;
create a staged copy of the index to be backed up having multiple stages, wherein the stages are handled asynchronously through a message queue;
segment the staged copy of the index; and
store the segments in a pre-selected location.

10. The article of claim 9 further comprising instructions that, when executed, cause the one or more processors to compress the segments of the staged copy.

11. The article of claim 9 further comprising instructions that, when executed, cause the one or more processors to perform additional indexing to the staged copy of the index based on information from one or more replay logs.

12. The article of claim 9 wherein the index to be backed up is an index corresponding to a single tenant ID within the multitenant environment.

13. The article of claim 9 wherein the index to be backed up is an index corresponding to a multiple tenant IDs within the multitenant environment.

14. An article of manufacture comprising a non-transitory computer-readable medium having stored thereon instructions that, when executed by one or more processors, cause the one or more processors to:
receive an indication to restore an index file to replace a faulty index file;
download one or more segments of a backup index file in response to the indication;
assemble the segments to create the backup index file;
replace the faulty index file with the backup index file with an atomic swap operation; and
update the backup index file with indexing operations performed based on a replay log having entries corresponding to a time period between creation of the backup index file and restoration of the backup index file, wherein the backup index file is created in a multitenant database environment, wherein the multitenant database environment stores data for multiple client entities each identified by a tenant identifier (ID) having one of one or more users associated with the tenant ID, wherein users of each of multiple client entities are only allowed access data identified by a tenant ID associated with the respective client entity, and wherein the multitenant database is a hosted database provided by an entity separate from the client entities, and provides on-demand database service to the client entities.

15. The article of claim 14 wherein the index to be backed up is an index corresponding to a single tenant ID within the multitenant environment.

16. The article of claim 14 wherein the index to be backed up is an index corresponding to a multiple tenant IDs within the multitenant environment.

17. A system comprising:
one or more user electronic systems;
a server electronic system communicatively coupled with the one or more user systems via a network, the server system to provide a multitenant environment, wherein the multitenant environment includes data for multiple client entities, each identified by a tenant identifier (ID) having one of one or more users associated with the tenant ID, users of each of multiple client identities are only allowed access data identified by a tenant ID associated with the respective client entity, and the multitenant environment is at least a hosted database provided by an entity separate from the client entities, and provides on-demand database service to the client entities, the server system further to identify an index to be backed up in the multitenant environment, create a staged copy of the index to be backed up having multiple stages, wherein the stages are handled asynchronously through a message queue, segment the staged copy of the index, and store the segments in a pre-selected location.

18. The system of claim 17, wherein the server system comprises multiple server computer systems.

19. The system of claim 17, the server system further to compress the segments of the staged copy.

20. The system of claim 17, the server system further to perform additional indexing to the staged copy of the index based on information from one or more replay logs.

21. The system of claim 17 wherein the index to be backed up is an index corresponding to a single tenant ID within the multitenant environment.

22. The system of claim 17 wherein the index to be backed up is an index corresponding to a multiple tenant IDs within the multitenant environment.

23. A system comprising:
one or more user electronic systems;
a server electronic system communicatively coupled with the one or more user systems via a network, the server system to provide a multitenant environment, wherein the multitenant environment includes data for multiple client entities, each identified by a tenant identifier (ID) having one of one or more users associated with the tenant ID, users of each of multiple client identities are only allowed access data identified by a tenant ID associated with the respective client entity, and the multitenant environment is at least a hosted database provided by an entity separate from the client entities, and provides on-demand database service to the client entities, the server system further to receive an indication to restore an index file to replace a faulty index file, to download one or more segments of a backup index file in response to the indication, to assemble the segments to create the backup index file, to replace the faulty index file with the backup index file with an atomic swap operation, and to update the backup index file with indexing operations performed based on a replay log having entries corresponding to a time period between creation of the backup index file and restoration of the backup index file.

24. The system of claim 23, wherein the server system comprises multiple server computer systems.

25. The system of claim 23 wherein the index to be backed up is an index corresponding to a single tenant ID within the multitenant environment.

26. The system of claim 23 wherein the index to be backed up is an index corresponding to a multiple tenant IDs within the multitenant environment.

* * * * *